United States Patent [19]

Mutterer et al.

[11] Patent Number: 5,004,759

[45] Date of Patent: Apr. 2, 1991

[54] STABILISATION OF POLYPHENYLENE ETHERS WITH MACROCYCLIC POLYALKYLPIPERIDINE COMPOUNDS

[75] Inventors: Francis Mutterer, St. Louis, France; Kurt Berger, Allschwil, Switzerland

[73] Assignee: Ciba-Geigy Corporation, Ardsley, N.Y.

[21] Appl. No.: 213,512

[22] Filed: Jun. 28, 1988

Related U.S. Application Data

[63] Continuation of Ser. No. 12,533, Feb. 9, 1987, abandoned.

[30] Foreign Application Priority Data

Feb. 14, 1986 [CH] Switzerland ............................ 596/86

[51] Int. Cl.$^5$ ................ C08K 5/349.2; C08K 5/349.3
[52] U.S. Cl. ........................................ 524/89; 524/90; 524/100
[58] Field of Search ........................... 524/100, 89, 90; 525/132

[56] References Cited

U.S. PATENT DOCUMENTS

| | | | |
|---|---|---|---|
| 3,383,435 | 5/1968 | Cizek | 525/132 |
| 3,925,509 | 12/1975 | Cooper et al. | 524/89 |
| 4,442,250 | 4/1984 | Canlatore | 524/100 |
| 4,665,112 | 5/1987 | Berdahl | 524/111 |

FOREIGN PATENT DOCUMENTS

| | | |
|---|---|---|
| 146879 | 7/1985 | European Pat. Off. |
| 81/62021 | 7/1981 | World Int. Prop. O. |

*Primary Examiner*—Kriellion Morgan
*Attorney, Agent, or Firm*—Harry Falber

[57] ABSTRACT

Macrocyclic polyaminotriazines containing tetramethylpiperidine side groups are suitable for use as stabilisers, in particular against degradation by UV light, for polyphenylene ethers. They have the advantage that they do not impair, or impair only to an insignificant degree, the dimensional stability under heat of these polymers.

6 Claims, No Drawings

STABILISATION OF POLYPHENYLENE ETHERS WITH MACROCYCLIC POLYALKYLPIPERIDINE COMPOUNDS

This application is a continuation of application Ser. No. 012,533, filed Feb. 9, 1987, now abandoned.

The present invention relates to the stabilisation of polyphenylene ethers, in particular against light-induced degradation, by addition of macrocyclic polyalkylpiperidine derivatives.

By polyphenylene ethers or polyphenylene oxides is meant a class of polymers that are characterised by a linear aromatic polyether structure and which correspond to the general formula

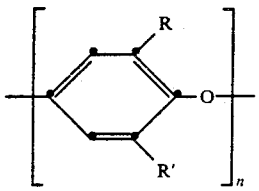

wherein R and R' may be hydrogen, alkyl, aryl, aralkyl, alkoxy or halogen and m is at least 50.

Particularly interesting polyphenylene ethers are those of the above formula in which R and R' are methyl or R and R' are phenyl.

These polymers are of particular interest for those fields of use in which high heat resistance is required. Compared with other linear polymers, they have a high glass transition temperature. Polyphenylene ethers are difficult to process on account of their high melt viscosity. For this reason, it is preferred to use mixtures of polyphenylene ethers with other polymers, especially with styrene homo- or copolymers which are readily miscible with polyphenylene ethers.

Like most organic polymers, polyphenylene ethers are degraded by UV radiation. To prevent such degradation, it is possible to add light stabilisers to the polyphenylene ethers and mixtures thereof with other polymers. To this end it has already been proposed to use UV absorbers of the benztriazole type and organic nickel compounds (see e.g. U.S. Pat. No. 3,925,509). Still more effective are the ethers and esters of 2,2,6,6-tetraalkyl-4-piperidinols proposed in PCT application WO 81/02021 and in European patent application 146 879, or the mixtures thereof with UV absorbers of the benztriazole type. However, these very effective light stabilisers have the drawback of exerting a plasticising effect on the polyphenylene ethers and thereby lowering their dimensional stability under heat. Hence such light stabilisers are not suitable for those utilities for which a preferably high dimensional stability under heat is desired.

It has now been found that specific macrocyclic polyalkylpiperidine compounds are excellent stabilisers for such polyphenylene ethers and do not lower, or lower to only an insignificant degree, the dimensional stability of the polymers under heat. Such macrocyclic compounds are disclosed in U.S. Pat. No. 4,442,250, where they are proposed as stabilisers for polyolefins, polydienes, vinyl chloride polymers, polyurethanes and other polymers, but not for stabilising polyphenylene ethers. These macrocyclic compounds have in general fairly high melt temperatures and are sparingly soluble. They have only very limited solubility in polyolefins and other aliphatic polymers, and their use as stabilisers in such substrates is problematical and has therefore not attained technical importance. It is thus surprising that specific compounds of this class are compatible with polyphenylene ethers in concentrations of up to about 5% and have no propensity to migrate, even during prolonged storage.

Accordingly, the present invention relates to stabilised compositions comprising a polyphenylene ether or a mixture thereof with one or more other polymers, which compositions are stabilised with a compound of formula I

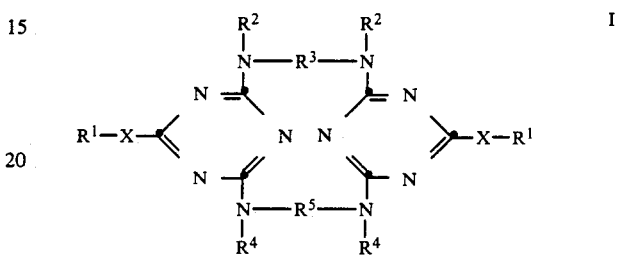

wherein
X is —O—, —S— or —N($R^6$)—,
$R^1$ is hydrogen, $C_1$–$C_{12}$alkyl, $C_2$–$C_4$hydroxyalkyl, $C_3$–$C_{12}$alkoxyalkyl, $C_3$–$C_{12}$alkenyl, $C_5$–$C_8$cycloalkyl, phenyl, naphthyl, $C_7$–$C_{12}$alkylphenyl, $C_7$–$C_{10}$phenylalkyl or a group of formula II

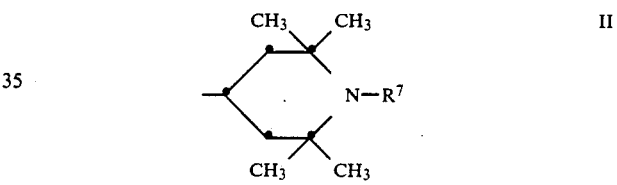

$R^2$ is $C_1$–$C_4$alkyl, $C_2$–$C_4$hydroxyalkyl, $C_3$–$C_{12}$alkoxyalkyl, $C_3$–$C_6$alkenyl, $C_5$–$C_8$cycloalkyl, phenyl, naphthyl, $C_7$–$C_{12}$alkylphenyl, $C_7$–$C_{10}$phenylalkyl or a group of formula II,
$R^3$ is $C_2$–$C_8$alkylene, $C_2$–$C_8$azaalkylene or $C_2$–$C_8$oxaalkylene, $C_6$–$C_8$cycloalkylene, phenylene, diphenylene or xylylene,
$R^4$ has one of the meanings assigned to $R^2$,
$R^5$ has one of the meanings assigned to $R^3$,
$R^6$ is $C_1$–$C_1$alkyl, $C_3$–$C_6$alkenyl, $C_2$–$C_4$hydroxyalkyl, $C_3$–$C_6$alkoxyalkyl, $C_5$–$C_8$cycloalkyl, phenyl, naphthyl, $C_7$–$C_{12}$alkylphenyl, $C_7$–$C_{10}$phenylalkyl or a group of formula II, or $R^1$ and $R^6$, when taken together, are tetramethylene, pentamethylene or 3-oxapentamethylene, and
$R^7$ is hydrogen, $C_1$–$C_4$alkyl, allyl, benzyl or acetyl, with the proviso that at least one of $R^1$, $R^2$, $R^4$ or $R^6$ is a group of formula II.

$R^1$, $R^2$, $R^4$, $R^6$ and $R^7$ as $C_1$–$C_4$alkyl may be unbranched or branched alkyl such as methyl, ethyl, isopropyl, n-butyl, sec-butyl or tert-butyl. $R^1$ as alkyl may also be isopentyl, n-hexyl, n-heptyl, n-octyl, 2-ethylhexyl, isodecyl or n-dodecyl.

$R^1$, $R^2$, $R^4$ and $R^6$ as $C_2$–$C_4$hydroxyalkyl may be 2-hydroxyethyl, 2-hydroxypropyl, 3-hydroxypropyl or 2-hydroxybutyl. $R^1$, $R^2$, $R^4$ and $R^6$ as $C_3$–$C_6$alkoxyalkyl may be 2methoxyethyl, 2-isopropoxyethyl, 2-butoxyethyl or 3-ethoxypropyl. $R^1$, $R^2$ and $R^4$ as alkoxyalkyl may also be 2-octyloxyethyl, 2-hexyloxypropyl or 2-butoxybutyl.

$R^1$, $R^2$, $R^4$ and $R^6$ as $C_3$–$C_6$alkenyl may be allyl, methallyl, crotonyl or 2,3-dimethylallyl. $R^1$ as alkenyl may also be 2octenyl or 2-decenyl.

$R^1$, $R^2$, $R^4$ and $R^6$ as $C_5$–$C_8$cycloalkyl may be cyclopentyl, cyclohexyl or cyclooctyl. $R^1$, $R^2$, $R^4$ and $R^6$ as $C_7$–$C_{10}$phenylalkyl may be benzyl, 1-phenylethyl, 2-phenylethyl or α,α-dimethylbenzyl. $R^1$, $R^2$, $R^4$ and $R^6$ as $C_7$–$C_{12}$alkylphenyl may be 3-methylphenyl, 4-isopropylphenyl, 4-tert-butylphenyl or 4-hexylphenyl.

$R^3$ and $R^5$ as $C_2$–$C_5$alkylene, $C_2$–$C_5$azaalkylene or $C_2$–$C_5$oxaalkylene may be branched or unbranched, e.g. 1,2-ethylene, 1,2-propylene, 1,3-propylene (trimethylene), tetramethylene, hexamethylene, octamethylene, 3-oxapentamethylene, 3-oxyheptamethylene, 3-azaheptamethylene, 3-methylazaheptamethylene or 3-hydroxyethylazaheptamethylene. $R^3$ and $R^5$ as cycloalkylene may be 1,3- or 1,4-cyclohexylene or 4,4'-methylenedicyclohexylene.

Preferred compositions are those stabilised with a compound of formula I, wherein X is —N($R^6$)—, $R^1$ is hydrogen, $C_1$–$C_4$alkyl or a group of formula II, $R^2$ and $R^4$ are hydrogen or a group of formula II, $R^3$ and $R^5$ are $C_2$–$C_6$alkylene, $R^6$ is $C_1$–$C_{12}$alkyl, phenyl, benzyl, cyclohexyl or a group of formula II, or $R^1$ and $R^6$, when taken together, are pentamethylene or 3-oxapentamethylene, and $R^7$ is hydrogen or methyl.

Particularly preferred compositions are those which are stabilised with a compound of formula I, wherein X is —N($R^6$)—, $R^1$ is hydrogen or a group of formula II, $R^2$ and $R^4$ are a group of formula II, $R^3$ and $R^5$ are hexamethylene, $R^6$ is $C_1$–$C_8$alkyl or a group of formula II, and $R^7$ is hydrogen.

The stabilisers of formula I can be prepared by the methods disclosed in U.S. Pat. No. 4,442,250. A special purification is in general not necessary.

The stabilisers of formula I are preferably added to the polyphenylene ethers in an amount of 0.1 to 5% by weight, most preferably of 0.5 to 3% by weight. Addition can be made by dry mixing of the powdered or granulated materials. Particularly good homogenisation is effected by extruding the mixture and granulating the extrudate.

In addition to the compounds of formula I, it is possible to add other stabilisers to the polyphenylene ethers. These co-stabilisers may be e.g. antioxidants, light stabilisers, UV absorbers, metal deactivators, phosphites or thiosynergists. Examples of co-stabilisers which may be used are:

1. Antioxidants 1.1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol.

1.2. Alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol.

1.3. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol).

1.4. Alkylidenebisphenols, for example 2,2'-methylenebis(6-tertbutyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol, 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl) butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis-[3,3-bis(3'-tert-butyl-4'-hydroxyphenyl)butyrate], bis(3-tert-butyl-4-hydroxy-5-methylphenyl)dicyclopentadiene, bis[2-(3'-tert-butyl-2'-hydroxy-5'-methylbenzyl)-6-tert-butyl-4-methylphenyl]terephthalate.

1.5. Benzyl compounds, for example 1,3,5-tris(3,5-di-tert-butyl-4-hydroxybenzyl)-2,4,6-trimethylbenzene, bis(3,5-di-tert-butyl-4-hydroxybenzyl) sulfide, isooctyl 3,5-di-tert-butyl-4hydroxybenzylmercaptoacetate, bis(4-tert-butyl-3-hydroxy-2,6-dimethylbenzyl) dithiolterephthalate, 1,3,5-tris(3,5-di-tert-butyl-4-hydroxybenzyl) isocyanurate, 1,3,5-tris(4-tert-butyl-3-hydroxy-2,6-dimethylbenzyl) isocyanurate, dioctadecyl 3,5-di-tert-butyl-4-hydroxybenzylphosphonate, calcium salt of monoethyl 3,5-di-tert-butyl-4-hydroxybenzylphosphonate.

1.6. Acylaminophenols, for example anilide of 4-hydroxylauric acid, anilide of 4-hydroxystearic acid, 2,4-bis(octylmercapto)-6-(3,5-di-tert-butyl-4-hydroxyanilino)-s-triazine, octyl N-(3,5-di-tert-butyl-4-hydroxyphenyl)carbamate.

1.7. Esters of β-(3,5-di-tert-butyl-4-hydroxyphenyl)-propionic acid with mono- or polyhydric alcohols, e.g. with methanol, diethylene glycol, octadecanol, triethylene glycol, 1,6-hexanediol, pentaerythritol, neopentyl glycol, tris(hydroxyethyl)isocyanurate, thiodiethylene glycol, N,N'-bis(hydroxyethyl)oxalic acid diamide.

1.8. Esters of β-(5-tert-butyl-4hydroxy-3-methylphenyl)propionic acid with mono- or polyhydric alcohols, e.g. with methanol, diethylene glycol, octadecanol, triethylene glycol, 1,6-hexanediol, pentaerythritol, neopentyl glycol, tris(hydroxyethyl)isocyanurate, thiodiethylene glycol, N,N'-bis(hydroxyethyl)oxalic acid diamide.

1.9. Amides of β-(3,5-di-tert-butyl-4-hydroxyphenyl)-propionic acid e.g. N,N'-bis(3,5-di-tert-butyl-4-hydroxyphenylpropionyl)hexamethylene-diamine, N,N'-bis(3,5di-tert-butyl-4-hydroxyphenylpropionyl)trimethylenediamine, N,N'-bis(3,5-di-tert-butyl-4-hydroxyphenylpropionyl)hydrazine.

2. UV Absorbers and Light Stabilisers 2.1. 2-(2'-Hydroxyphenyl)benzotriazoles, for example the 5'-methyl, 3',5'-di-tert-butyl, 5'-tert-butyl, 5'-(1,1,3,3-tetramethylbutyl), 5-chloro-3',5'-di-tert-butyl, 5-chloro-3'-tert-butyl-5'-methyl, 3'-sec-butyl-5'-tert-butyl, 4'-octoxy, 3',5'-di-tert-amyl and 3',5'-bis(α,α-dimethylbenzyl) derivatives.

2.2. 2-Hydroxybenzophenones, for example the 4-hydroxy, 4-methoxy, 4-octoxy, 4-decyloxy, 4- dodecyloxy, 4-benzyloxy, 4,2',4'-trihydroxy and 2'-hydroxy-4,4'-dimethoxy derivatives.

2.3. Esters of substituted and unsubstituted benzoic acids, for example, 4-tert-butylphenyl salicylate, phenyl salicylate, octylphenyl salicylate, dibenzoylresorcinol, bis(4-tert-butylbenzoyl)resorcinol, benzoylresorcinol, 2,4-di-tert-butylphenyl 3,5-di-tert-butyl-4-hydroxybenzoate and hexadecyl 3,5-di-tert-butyl-4-hydroxybenzoate. 2.4. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxy-cinnamate, butyl α-cyano-β-methyl-p-methoxycinnamate, methyl α-carbomethoxy-p-methoxycinnamate and N-(β-carbomethoxy-β-cyanovinyl)-2-methylindoline.

2.5. Nickel compounds, for example nickel complexes of 2,2'-thiobis[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of 4-hydroxy-3,5-di-tert-butylbenzylphosphonic acid monoalkyl esters, e.g. of the methyl or ethyl ester, nickel complexes of ketoximes, e.g. of 2-hydroxy-4-methylphenyl undecyl ketoneoxime, nickel complexes of 1-phenyl-4-lauroyl-5-hydroxypyrazole, with or without additional ligands.

2.6. Sterically hindered amines, for example bis(2,2,6,6-tetramethylpiperidyl) sebacate, bis(1,2,2,6,6-pentamethylpiperidyl) sebacate, bis(1,2,2,6,6-pentamethylpiperidyl) n-butyl-3,5-di-tert-butyl-4-hydroxybenzylmalonate, the condensate of 1-hydroxyethyl-2,2,6,6-tetramethyl-4-hydroxypiperidine and succinic acid, the condensate of N,N'-bis(2,2,6,6-tetramethyl-4-piperidyl)-hexamethylenediamine and 4-tert-octylamino-2,6-dichloro-1,3,5-s-triazine, tris(2,2,6,6-tetramethyl-4-piperidyl) nitrilotriacetate, tetrakis(2,2,6,6-tetramethyl-4-piperidyl)-1,2,3,4-butane tetracarboxylate, 1,1'-(1,2-ethanediyl)bis(3,3,5,5-tetramethylpiperazinone).

2.7. Oxalyl diamides, for example 4,4'-dioctyloxyoxanilide, 2,2'-dioctyloxy-5,5'-di-tert-butyloxanilide, 2,2'-didodecyloxy-5,5'-di-tert-butyloxanilide, 2-ethoxy-2'-ethyloxanilide, N,N'-bis(3-dimethylaminopropyl)oxalamide, 2-ethoxy-5-tert-butyl-2'-ethyloxanilide and its mixture with 2-ethoxy-2'-ethyl-5,4'-di-tert-butyloxanilide and mixtures of ortho- and para-methoxy-disubstituted oxanilides and mixtures of o- and p-ethoxy-disubstituted oxanilides.

3. Metal deactivators, for example N,N'-diphenyloxalic acid diamide, N-salicylal-N'-salicyloylhydrazine, N,N'-bis(salicyloyl)hydrazine, N,N'-bis(3,5-di-tert-butyl-4-hydroxyphenylpropionyl)hydrazine, 3-salicyloylamino-1,2,4-triazole, bis(benzylidene)oxalic dihydrazide.

4. Phosphites and phosphonites, for example triphenyl phosphite, diphenylalkyl phosphites, phenyldialkyl phosphites, tris(nonylphenyl) phosphite, trilauryl phosphite, trioctadecyl phosphite, distearyl pentaerythritol diphosphite, tris(2,4-di-tert-butylphenyl) phosphite, diisodecyl pentaerythritol diphosphite, bis(2,4-di-tert-butylphenyl) pentaerythritol diphosphite, tristearyl sorbitol triphosphite, tetrakis(2,4-di-tert-butylphenyl) 4,4'-biphenylene diphosphonite, 3,9-bis(2,4-di-tert-butylphenoxy)-2,4,8,10-tetraoxa-3,9-diphosphaspiro[5.5]undecane.

5. Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(β-dodecylmercapto)propionate.

Further modifiers which may be used concurrently are: fillers and reinforcing agents such as calcium carbonate, barium sulfate, talcum, kaolin, asbestos, metal oxides, carbon black, graphite, glass or carbon fibres. Examples of further possible additives are: pigments, fluorescent whitening agents, flame retardants, antistatic agents or lubricants.

The following Example illustrates the preparation and testing of a stabilised polyphenylene ether of this invention. Parts and percentes are by weight.

EXAMPLE 97 parts of a granular polyblend obtained from poly(2,6-dimethyl-1,4-phenylene)ether and a rubber-modified polystyrene (Noryl ®SE 100, ex General Electric Co.) are mixed with 3 parts of powdered stabiliser of formula

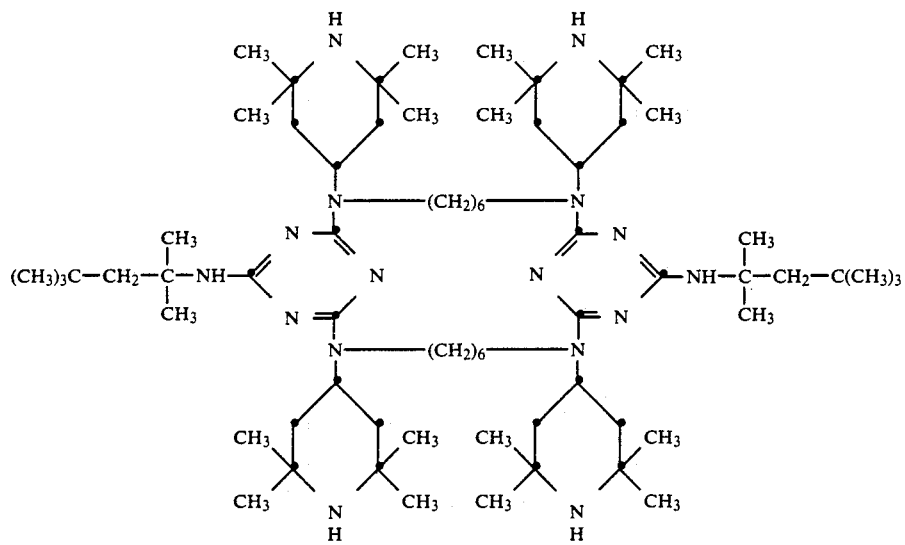

S-1 and the mixture is homogenised and granulated by extrusion (temperature: 240°/250°/240° C.). The granulate is processed in an injection moulding machine to sheets measuring 40×50×2 mm.

These samples are then tested for the following properties: (a) the glass transition temperature (Tg) in a Mettler TA 3000 thermomechanical analyser, and (b) the softening temperature (Ts) according to Vicat (ASTM D 1525).

The samples are further irradiated for 400 and 600 hours with UV light in a Xenotest 450 weathering device and the resultant yellowing is determined in accordance with the Yellowness Index.

The results are reported in the following table.

| Stabilisers | Tg (TMA) | Ts (Vicat) | Yellowness Index after | | |
|---|---|---|---|---|---|
| | | | 0 | 400 | 600 h |
| none | 128.8° | 117° | 3.4 | 22.3 | 29.8 |
| 3% S-1 | 126.9° | 116° | 5.2 | 11.2 | 18.4 |

The values show that very good light stabilisation is obtained without the dimensional stability under heat being noticeably impaired.

Similar results are obtained by using 1 or 2% of stabiliser as well as using as co-stabilisers the compounds described in Examples 1, 6, 7, 11, 12 and 27 of U.S. Pat. No. 4,442,250.

What is claimed is:

1. A stabilised composition comprising a polyphenylene ether with an effective light stabilizing amount of a compound of formula I

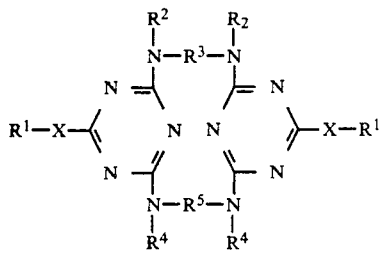

wherein

X is $-O-$, $-S-$ or $-N(R^6)-$, $R^1$ is hydrogen, $C_1-C_{12}$alkyl, $C_2-C_4$hydroxyalkyl, $C_3-C_{12}$alkoxyalkyl, $C_3-C_{12}$alkenyl, $C_5-C_8$cycloalkyl, phenyl, naphthyl, $C_7-C_{12}$alkylphenyl, $C_7-C_{10}$phenylalkyl or a group of formula II

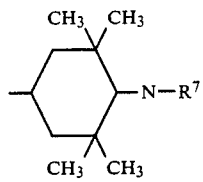

$R^2$ is $C_1-C_4$alkyl, $C_2-C_4$hydroxyalkyl, $C_3-C_{12}$alkoxyalkyl, $C_3-C_6$alkenyl, $C_5-C_8$cycloalkyl, phenyl, naphthyl, $C_7-C_{12}$alkylphenyl, $C_7-C_{10}$phenylalkyl or a group of formula II, $R^3$ is $C_2-C_8$alkylene, $C_2-C_8$azaalkylene or $C_2-C_8$oxaalkylene, $C_6-C_8$cycloalkylene, phenylene, diphenylene or xylylene, $R^4$ has one of the meanings assigned to $R^2$, $R^5$ has one of the meanings assigned to $R^3$, $R^6$ is $C_1-C_{12}$alkyl, $C_3-C_6$alkenyl, $C_2-C_4$hydroxyalkyl, $C_3-C_6$alkoxyalkyl, $C_5-C_8$cycloalkyl, phenyl, naphthyl, $C_7-C_{12}$alkylphenyl, $C_7-C_{10}$phenylalkyl or a group of formula II, or $R^1$ and $R^6$, when taken together, are tetramethylene, pentamethylene or 3-oxapentamethylene, and $R^7$ is hydrogen, $C_1-C_4$alkyl, allyl, benzyl or acetyl, with the proviso that at least one of $R^1$, $R^2$, $R^4$ or $R^6$ is a group of formula II.

2. A stabilised composition according to claim 1, which is stabilised with a compound of formula I, wherein X is $-N(R^6)-$, $R^1$ is hydrogen, $C_1-C_4$alkyl or a group of formula II, $R^2$ and $R^4$ are hydrogen or a group of formula II, $R^3$ and $R^5$ are $C_2-C_6$alkylene, $R^6$ is $C_1-C_{12}$alkyl, phenyl, benzyl, cyclohexyl or a group of formula II, or $R^1$ and $R^6$, when taken together, are pentamethylene or 3-oxapentamethylene, and $R^7$ is hydrogen or methyl.

3. A stabilised composition according to claim 2, wherein X is $-N(R^6)-$, $R^1$ is hydrogen or a group of formula II, $R^2$ and $R^4$ are a group of formula II, $R^3$ and $R^5$ are hexamethylene, $R^6$ is $C_1-C_8$alkyl or a group of formula II, and $R^7$ is hydrogen.

4. A stabilised composition according to claim 1, which is stabilised with a compound of formula

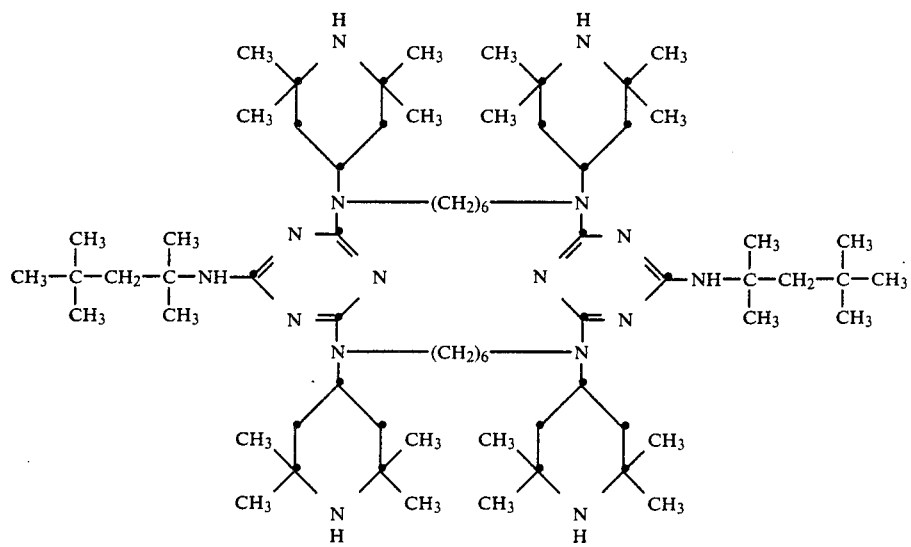

5. A stabilised composition according to claim 1, which contains 0.1 to 5% by weight, of the stabiliser of formula I.

6. A stabilised composition according to claim 1, wherein said polyphenylene ether corresponds to the formula $$\left[\begin{array}{c} \vphantom{\Big|} \\ \end{array}\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\right]$$

wherein R is methyl or phenyl and n is at least 50.